Figure 1:
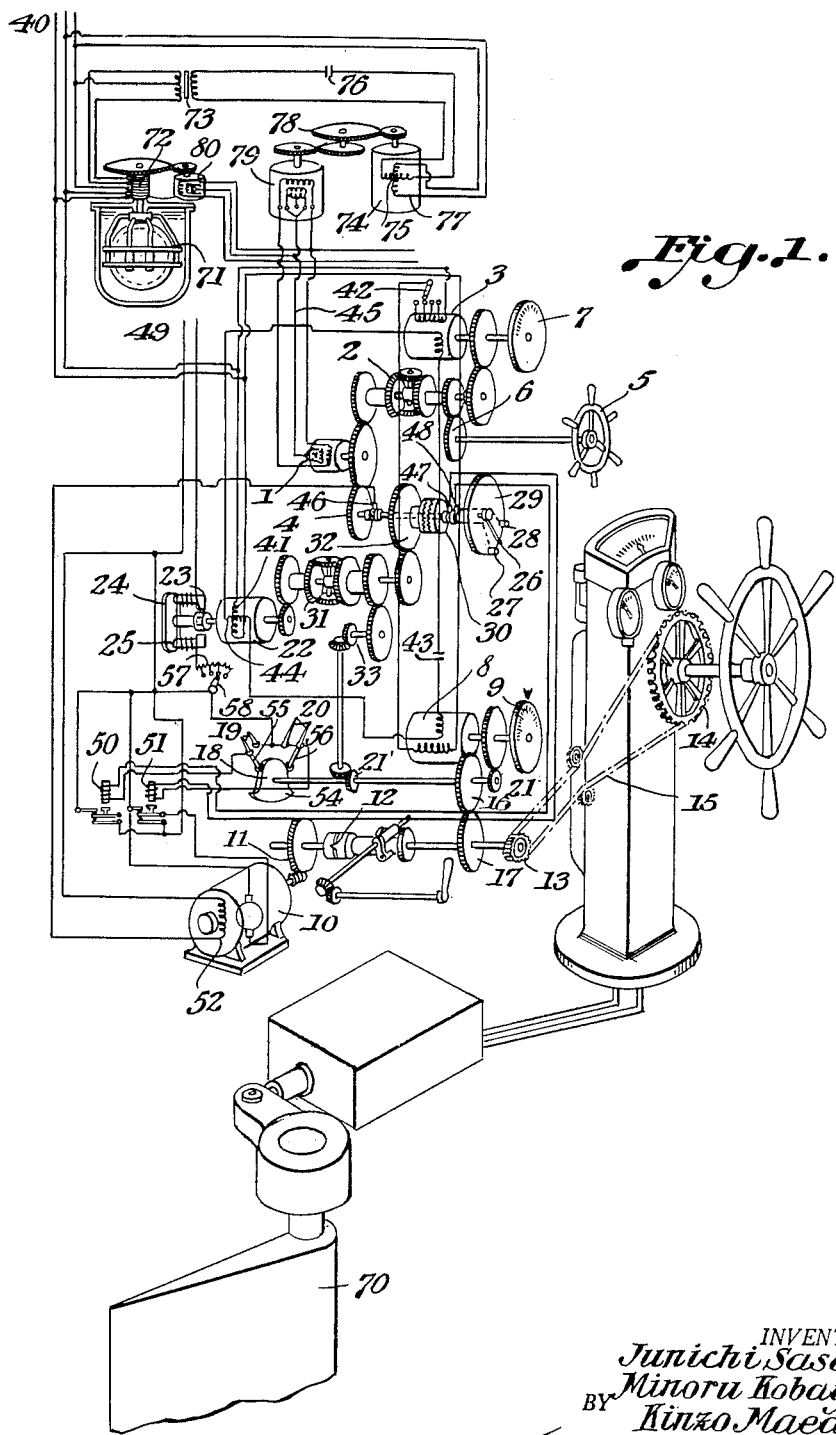

Feb. 28, 1956   JUN-ICHI SASAKI ET AL   2,736,856
ELECTRICAL RUDDER CONTROL APPARATUS
Filed May 4, 1951   2 Sheets-Sheet 1

INVENTOR.
Junichi Sasaki,
BY Minoru Kobayasi,
Kinzo Maeda.
ATTYS.

2,736,856

ELECTRICAL RUDDER CONTROL APPARATUS

Jun-Ichi Sasaki and Minoru Kobayashi, Tokyo, and Kinzo Maeda, Kanagawa-ken, Japan, assignors to Kabushiki Kaisha Hokushin Denki Seisakusho, Tokyo, Japan, a corporation of Japan Application May 4, 1951, Serial No. 224,506

Claims priority, application Japan May 18, 1950

4 Claims. (Cl. 318—489)

This invention relates to the automatic steering gear, with particular reference to the improvements in the rudder checking system thereof.

As is widely known, the essentials of the steering consist in managing the returning rudder to return the direction of the ship when the ship deviates from the prescribed course, and in managing the checking rudder, in consideration of the inertia of the ship, to prevent the ship from returning beyond the prescribed course. The automatic steering, therefore, has the function of both the returning rudder and the checking rudder.

The principal object of the present invention is to provide the automatic steering gear, whereby the rudder will stay in the direction of the exact course of the ship when the ship is returned to her prescribed course and whereby the ship will not induce the yawing due to a certain unstable rudder angle left, said unstable rudder angle being quite common to automatic steering gear of the common type when the ship returns her course.

Another object of the present invention consists in providing a reliable arrangement to attain the principal object mentioned above and in providing an arrangement by which the helm adjustment and the rudder checking adjustment can be made in a simple manner.

In accordance with a feature of the present invention, the checking rudder is so constructed and arranged so as to provide a rudder angle which is proportional to the turning angular velocity of the ship. The said rudder angle starts from zero, and is varied continuously, so as to be proportional to the turning angular velocity of the ship.

Another feature of the present invention is to control the rudder angle by means of a voltage, which is the resultant from both the voltage induced corresponding to the deviation angle from the prescribed course of the ship and the voltage induced corresponding to the returning rudder angle, so that it will be proportional to the turning angular velocity of the ship by rotating the reversible motor to which the said resultant voltage is applied.

Another feature of the present invention is to induce, in the rotary voltage regulator, the said voltage corresponding to the deviation angle of the course and the said voltage corresponding to the returning rudder angle, and to regulate the ratio of the returning rudder angle to the deviation angle of the course by means of changing the number of turns of the primary coil of the said rotary voltage regulator.

Another feature of the present invention is to regulate the effect of the checking rudder by providing an eddy current brake to the shaft of the said reversible motor and by varying the exciting current thereof.

These and other features of the present invention will become more apparent by reference to the description given in connection with the drawings which illustrate one embodiment of the present invention.

For the better understanding of the objects and features of the present invention, a brief description is hereby given on the automatic steering gear of the common type.

In the automatic steering gear of the common type, a rotary contactor is revolved by the azimuth motor driven by the gyro-compass when the ship deviates from the prescribed course, said rotary contactor closes the electric circuit by contacting the electric contact on one side, rotates the steering motor, drives the telemotor or the steering engine, and changes the rudder angle. At the same time, the said steering motor turns, through the gear, either the rotary contactor or the electric contact to the direction whereby the contact of the two will be broken. In this way, the steering motor rotates until the rudder angle will be proportional to the deviation angle of the ship, and then the contactor breaks the contact, the circuit breaks, and the steering motor ceases its motion. In order to manage the returning rudder and the checking rudder, by repeating this action, to prevent the ship from leaving too far from the prescribed course, and to damp the amplitude of yawing at the earliest moment, an adjustable gap is generally provided in the structure which transmits the rotation of the steering motor to the rotary contactor or to the electric contact.

Since the rudder angle increases towards the direction to return the ship, in case the ship deviates from the prescribed course, the turning of the ship will be gradually slowed down and the turning finally stops, but immediately after, the ship begins again to turn to the direction approaching the prescribed course. At this moment, the electric contact makes the electric contact of the other side, closing another electric circuit, and the steering motor begins to revolve in the opposite direction reversing the rudder angle, and until the rotation of the steering motor is transmitted to the electric contact or contactor, the steering motor rotates just to the angle corresponding to the gap in the transmission mechanism. Accordingly, the phase of the rudder angle thereafter is in advance of the deviation angle of the course; this acts as the checking rudder, damps the amplitude of yawing, and turns the ship to the prescribed course. In this system of the steering gear, because of the structural reasons, the rudder angle will be always uncertain when it is less than the angle corresponding to the magnitude of the gap in the transmission mechanism, and accordingly, the course of the ship will be uncertain within the limits corresponding to the said gap angle. A larger gap will be required if better control of the checking rudder is wanted, and the width of deviation of the course of the ship will increase more and more. These are the main defects of this system.

The equation of motion of the ship under the conditions indicated above is:

$$I\frac{d^2\theta}{dt^2} + k\mu = 0 \tag{1}$$

The relations of $\mu$ and $\theta$ is, $$\mu = n(\theta \pm \rho) \tag{2}$$

where,
I is the apparent moment of inertia of the ship,
$\theta$ is the deviation angle of the ship from the prescribed course,
$\mu$ is the rudder angle,
k is the torque given to the ship by the unit rudder angle,
$\rho$ is the deviation angle corresponding to the gap,
n is the ratio of the rudder angle to the deviation angle, and The sign ($\pm$) of $\rho$ is different depending upon the direction of $$\frac{d\theta}{dt}$$

The following solution is derived from the Equations 1 and 2:

$$\theta \pm \rho = \theta_0 \sin\left(\sqrt{\frac{kn}{I}}t + \theta_1\right) \quad (3)$$

In the above equations, $\theta_0$, $\theta_1$ are the integration constants determined by the initial condition.

The Equation 3 shows that the deviation angle $\theta$ decreases, the amplitude of yawing of the ship damping by the angle $2\rho$ at every half period of yawing, and the said damping continues until $\theta$ equals $2\rho$. In other words, the limit of the rudder angle $$\mu \leqq |\rho|$$

namely, the amplitude of $2\rho$ will be uncertain, and the course will also be uncertain. If $\rho$ is made larger, the damping effects will increase, but the uncertainty of the course will also increase.

According to the present invention, the effect of the gap as explained in connection with the common type of control mechanism is not employed. The turning angular velocity of the ship is employed in its stead, and a rudder angle proportional to the said velocity is taken, so that the angle of the checking rudder varies continuously, starting from zero, and proportionally to the turning angular velocity of the ship, and the returning rudder angle together with the checking rudder angle disappear when the ship stays at the prescribed course, and thereby the course of the ship will be stabilized also.

The invention will be particularly described with reference to the accompanying drawings which illustrate one embodiment of the invention.

In the drawings,

Fig. 1 shows the schematic diagram of the embodiment, and

Figure 2:
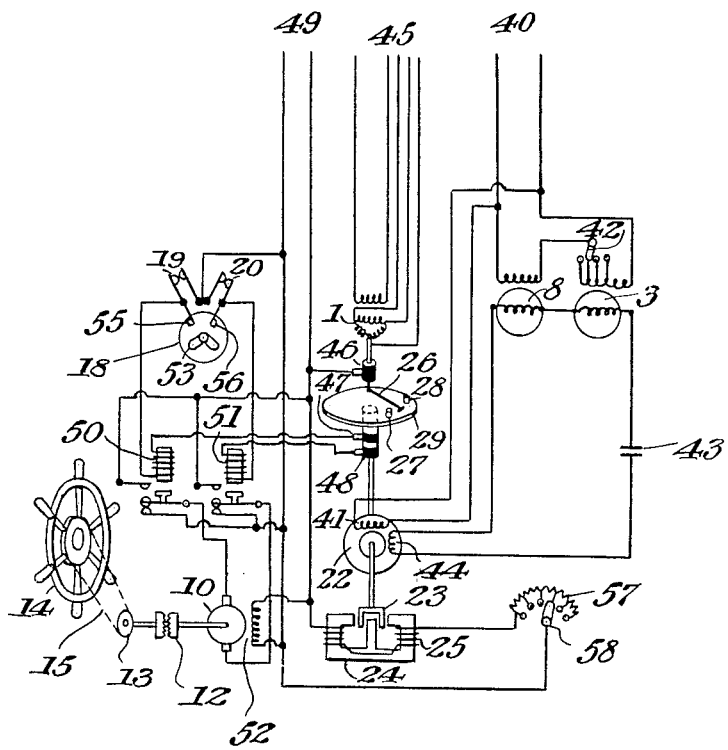

Fig. 2 the electric circuit diagram thereof.

In Fig. 1, an azimuth motor which transmits the course of the ship from the gyro-compass is indicated at 1, a differential gear at 2, and a rotary voltage regular is indicated at 3 which induces the voltage proportional to or corresponding to the deviation angle $\theta$ of the ship from her prescribed course, the secondary rotor of the said rotary voltage regulator being rotated by the rotation of the azimuth motor 1 and the differential gear 2. A handle 5 regulates the prescribed course by rotating the rotor of the rotary voltage regulator 3 through a gear 6 and the differential gear 2. A graduated scale 7 shows the angular difference between the actual course and the prescribed course, and is fixed to the rotor of the rotary voltage regulator. A voltage regulator 8 induces the voltage proportional to or corresponding to the rudder angle $\mu$, and has the same features as the rotary voltage regulator 3. A graduated scale 9 shows the rudder angle, a steering motor is indicated at 10, a worm gear at 11, a clutch at 12, a sprocket wheel at 13, and a telemotor at 14. The rotation of the steering motor 10 makes the sprocket wheel 13 rotate through the worm gear 11, and the clutch 12, which in turn rotates the telemotor 14 by endless chain 15 and controls the rudder angle. A gear 16, a gear 17, the rotating parts 18 of the limit switch, and two sets of the contactors 19 and 20 of the limit switch are provided, the rotation of the steering motor being provided by the rotating parts 18 of the limit switch through the gear 16 and the gear 17, and the rotating parts 18 disconnecting either the contactor 19 or the contactor 20 at a proper rudder angle. Also, the rotation of the steering motor 10 is transmitted to the rotor of the voltage regulator 8 through the spur gears 16 and 17 and gear 21. A reversible motor 22 is rotated by the supply of the voltage from the voltage regulators 3 and 8 and from the source, and a hollow metallic cap 23 fitted to the rotor shaft of the motor 22 is placed covering the edge of the iron core 24, and when a coil 25 wound on the iron core is excited by the direct current, the eddy current brake force will work against the rotation of the hollow metallic cap 23. An electric contact member 26 rotates by the rotation of the azimuth motor 1 through the gear 4. Contact pieces 27 and 28 close the electric circuit by contacting the contact member 26 and are influenced by the contact member 26 when the latter rotates and engages 27 or 28. The contact pieces 27 and 28 are fitted on a disc 29 which in turn is fitted on a friction disc 30. The rotation of the reversible motor is transmitted to a friction disc 32 through the gear and the differential gear 31. The friction discs 30 and 32 are coupled together by friction, and the disc 30 is fitted on the disc 29. When the contact member 26 does not contact the contact piece 27 or 28, the rotation of the disc 29 is transmitted from the reversible motor 22 through the discs 32 and 30, but when the contact member 26 contacts the contact piece 27 or 28, the discs 32 and 30 slip together and the disc 29 and the contact member 26 rotate en bloc. The rotation of the steering motor 10 is transmitted to the disc 32 through the gears 21', 33 and the differential gear 31, and it prevents the contactor 26 from hunting between the contact pieces 27 and 28.

The North seeking part of the gyro compass is shown at 71. The follow up mechanism of the gyro compass is as follows: The angular difference between the North seeking sensitive element and the follow up part generates an electrical quantity which is given from 71 to a differential transformer 73 through a slip ring 72, and is the induced voltage in the secondary winding of the said differential transformer 73. The said voltage is transmitted to the field coil of the follow up motor 74. A condenser to change the phase of the electric current is shown at 76, and the rotor of 74 is rotated to the left or to the right by the said current and the current flowing at the field coil of 77. The rotation of the rotor causes the transmitter 79 of the azimuth motor to rotate through gear 78. The voltage from the said transmitter is then transmitted to the azimuth motor 1 so that the latter is made to follow up. Similarly, the voltage is transmitted to the azimuth motor 80 of the gyro compass, and the follow up is completed.

Azimuth motor 80 is a self-synchronous motor, which is a receiving unit of the transmitter 79. 1 is also a receiving unit of the transmitter 79. When the angular position of the rotor of the transmitter is equal to that of each rotor of 80 and 1, the voltages of 80 and 79 and the voltages of 1 and 79 are balanced, and therefore, each rotor of 80 and 1 does not rotate. When the rotor of the transmitter rotates a certain angle, an electric current passes through each rotor of 80 and 1, and the rotor rotates. Then, each rotor of 80 and 1 rotates the same angle as that of the rotor of the transmitter, and the voltages of the transmitter 79 and 80 and the voltages of the transmitter 79 and 1 are balanced, and the rotation of the rotors stops. In such manner, each rotor of 80 and 1 follows ups the angular position of the rotor of the transmitter 79.

In Fig. 2, a proper A. C. source 40 is supplied to the primary coils of the voltage regulators 3 and 8 and the field coil 41 of the reversible motor 22. A switch 42 is provided for changing the number of turns of the primary coil of the voltage regulator 3, by means of which the ratio of the rudder angle $\mu$ to the deviation angle $\theta$ may be varied. A phase-shifting condenser 43 is used for generating the most effective torque at the rotor by the current flowing into the field coil 41 and the coil 44. The voltages induced at the rotor of the voltage regulators 3 and 8 are both zero when the deviation angle $\theta$ and the rudder angle $\mu$ are zero; these voltages increase as $\theta$ and $\mu$ increase, and the phases thereof vary by 180° depending upon the senses of $\theta$ and $\mu$. The rotor of the reversible motor 22 generates the torque which corresponds to the phase and intensity of the current flowing in the coil 44, and therefore, if the ratio of the deviation angle $\theta$ to the rudder angle $\mu$ equals 1, the rotor stops when $\theta$ and $\mu$ are both zero, and it rotates at the torque proportional to the difference of $\theta$ and $\mu$ if these have certain values. The direction of rotation will be determined by the phase of the deviation angle $\theta$ or of the rudder angle $\mu$ depending upon which of these two has the larger absolute value. If the absolute values of $\theta$ and $\mu$ are equal, the torque will be zero when these are of counter phase, and the rotor rotates at the torque twice as much when these are in phase. A source for driving the azimuth motor 1 by the azimuth transmitter of the gyro-compass is indicated at 45. A slip ring and the brushes are shown at 46, 47 and 48 which lead the current to the contact member 26, contact pieces 27 and 28. A D. C. source 49 is supplied to the exciting coil 25, the contact member 26, the contact pieces 27 and 28, the relays 50 and 51, the rotor of the steering motor 10, the field coil 52, the contactors 19 and 20 of the limit switch. When the rotating speed of the contact member 26 and the rotating speed of the disc 29 are not equal, the contact member 26 contacts the contact piece 27 or 28. That is, when the relative speed of the disc 29 to the contact member 26 is clockwise, the contact member 26 contacts the contact piece 28, and when the said relative speed is counter-clockwise, the contact member 26 contacts the contact piece 27. Assuming that the contact member 26 contacts the contact piece 27, the current will flow from the slip ring and the brush 47 back to the source, through the coil of the relay 50 and via the contactor 19. By the action of the relay 50, the rotor of the steering motor 10 is connected to the source, drives the telemotor 15 and varies the rudder angle $\mu$. The rotation of the steering motor varies the angle of the rotor of the voltage regulator 8, the variation of current of the field coil 44 of the reversible motor 22 will result in the variation of the rotating speed of the disc 29, and at the moment when the rotating speed of the disc 29 equals the rotating speed of the contact member 26, the contact member 26 leaves the contact piece 27, the relay 50 ceases to work, and the rotor windings of the steering motor 10 are disconnected from the source, then short-circuited and the rotor stops suddenly. The rotating direction of the steering motor 10 as well as the direction to which the rudder angle $\mu$ is changed will be just the reverse depending upon whether the contact member 26 contacts the contact piece 27 or 28. In order to prevent the rudder angle $\mu$ from exceeding the limit by the rotation of the steering motor 10, the contactors 19 and 20 act to stop the steering motor. This is done by the arm 53 or 54 which pushes the contact 55 or 56 and disconnects the said contactor 19 or 20 when the rudder angle $\mu$ reaches the limit. Since the brake torque on the metallic cap 23 is proportional to the rotating speed, the influence of the mechanical friction in the route of transmission of rotation from the reversible motor 22 to the shaft 32 can be made smaller and the relations between the current flowing in the field coil 44 of the reversible motor 22 and the rotating speed of the disc 29 can be made more stable. By varying the resistance 57 by means of a switch 58, the current flowing in the coil 25 can be controlled and the effect of the checking rudder will be regulated to adapt to the characteristics of the ship, weather conditions and any other conditions.

The mutual relations between the phase of the voltage induced in the rotor of the voltage regulators 3 and 8, the direction of rotation of the reversible motor 22, the direction of rotation of the azimuth motor 1 and the steering motor 10 etc. may be determined to satisfy the following conditions:

1. That the direction of the rudder angle $\mu$, at the time when the ship is in the direction of the deviation angle $\theta$ from her prescribed course and when the angular velocity $$\frac{d\theta}{dt}$$

is zero, shall be determined so that the course of the ship will be changed to the direction at which the deviation angle $\theta$ will be decreased and the magnitude of the angle shall be proportional to the deviation angle $\theta$.

2. that the rudder angle $\mu$, at the time when the ship is in the direction of the deviation angle $\theta$ from her prescribed course and when the angular velocity $$\frac{d\theta}{dt}$$

has a certain value, shall be resultant of both the rudder angle of the foregoing 1 and the rudder angle proportional to the angular velocity $$\frac{d\theta}{dt}$$

and that the direction of the latter rudder angle shall be determined so that the course of the ship will be changed to the direction at which the angular velocity of the ship will be decreased.

The mechanism operates as follows:

Supposing that a ship having the prescribed course turns its direction by the force of the wave, the azimuth motor 1 of the gyro compass will rotate by a slight turning of the ship. The said rotation is transmitted to the friction disc 32 and the contact 26 through the gear 4. However, as the friction coupling between the friction discs 32 and 30 slips, the discs 30 and 29 do not rotate. After the contact 26 makes contact with 27 or 28, one of these 27 or 28 is pushed by 26 and the discs 30 and 29 rotate together with 26. The direction of rotation of the contact 26 corresponds to that of the turning of ship, and the rotation speed of 26 is proportionate to the turning angular velocity of the ship.

When the contact 26 makes contact with contact 27 or 28, the electric current flows from 26, through 27 or 28 and a brush 47 or 48, to the coil 50 or 51 of the relay. The relay acts, and by the action of the relay, the steering motor 10 rotates. Then, the rotation of 10, through the sprocket wheel 13 and the chain 15, makes the shaft of the telemotor 14 rotate. The rotation of the telemotor 14 causes the rudder 70 to turn by actuating a conventional steering engine 61.

The rotation of the motor 10 is transmitted to the rotor of the rotary voltage regulator 8 through the worm gear 11, the clutch 12 and the gears 16, 17 and 21. The induced voltage of 8 is proportionate to the rudder angle $\mu$, and corresponds to its direction. The direction of rotation of the motor 10 is different depending upon whether the contact 26 contacts 27 or 28.

The rotation of the azimuth motor 1 is also transmitted to the rotor of the rotary voltage regulator 3 through the differential gear 2. The induced voltage of 3 is proportionate to the deviation angle $\theta$ of the ship from the prescribed course and has a phase corresponding thereto. The difference of the induced voltages of the rotary voltage regulators 3 and 8 is supplied to the reversible motor 22.

The rotation speed of the rotor of 22 is proportionate to the supply voltage, and therefore is proportionate to $\mu - n\theta$. An eddy current brake is provided at the end of the said rotor. When the electric current in the coil 25 is varied, the brake force is changed. Taking this variable constant as M, the speed of the rotor of 22 is proportionate to $M(\mu - n\theta)$. The said rotation is transmitted to the disc 29 and the contact members 27 and 28 through the differential gear 31 and the disc 32. The rotation speed of 27 and 28 is $M(\mu - n\theta)$. When the rotation speed of the contact 26 and that of 27 and 28 are different, 26 contacts either 27 or 28, and the rudder angle is changing. At that time, 27 or 28 rotates, pushed by and together with 26. The friction coupling of the friction discs 32 and 30 is slipped. By the change of the rudder angle, the rotation speed of 26 is finally made equal to that of 27 and 28.

As the rotation speed of 26 is $$\frac{d\theta}{dt}$$

and that of 27 and 28 is $M(\mu-n\theta)$, $$\frac{d\theta}{dt}=M(\mu-\theta) \qquad (4)$$

In practice, when the contact 26 is of the equal rotation speed to that of 27 or 28, the contact of 26 with 27 or 28 will not be released by that. Therefore, a mechanism is provided so as to transmit the rotation of the drive motor 10 to the contacts 27 and 28 through the gears 16, 17, 21' and 33 and the discs 32, 30 and 29 in order to release the said contact of 26 with 27 or 28. Once the contact is released, the motor 10 stops its motion, and 26 maintains the equal rotation speed, released from 27 or 28.

From the Equations 1 and 4, the following formula is derived:

$$I=\frac{d^2\theta}{dt^2}+\frac{k}{M}\frac{d\theta}{dt}+kn\theta=0 \qquad (5)$$

The formula 5 is the equation of the damped oscillation, the solution of which is, $$\theta=\theta_0\epsilon^{-\frac{k}{2IM}t}\sin\left(\frac{\sqrt{4Ikn-\left(\frac{k}{M}\right)^2}}{2I}t+\theta_1\right) \qquad (6)$$

where, $\theta_0$, $\theta_1$ are the integration constants determined by the initial condition, and $\epsilon$ is the base of natural logarithm.

From the Formula 6 it is made clear that the damping effect to the deviation angle $\theta$ can be regulated at will by changing M; and by selecting a proper value for M, the ship can be stayed at the prescribed course without yawing, i. e. in the condition of critical damping. It is also clear that the deviation angle $\theta$ tends to zero exponentially as the lapse of time $t$. In this case, the deviation angle $\theta$ will be exactly zero, leaving no room for uncertainty in the process of damping, and, compared with the Formula 3, explained in connection with the common type, it is made clear that the steering gear of the present invention is not attended with an unstable width of the course as in the case of the automatic steering gear of the common type.

It must be understood that, although the steering motor is shown as driving the telemotor 14 in the foregoing embodiment, the rudder can be directly controlled by means of a proper connection between the steering motor and the steering room.

A "checking rudder" is a rudder which acts to decrease the turning angular velocity in case the ship is turning. For example, let us suppose that the ship is turning to the right direction by taking the starboard rudder angle, and we change the rudder angle to the port direction. The latter angle acts in the direction of stopping the turning motion of the ship. In such case, the above port rudder is the checking rudder.

The "checking rudder angle" is the angle of the checking rudder as above defined.

The "rudder checking means" is the means of the checking rudder as above defined.

A "returning rudder" is a rudder which acts to return the ship to the prescribed course in case the direction of the ship deviates from the prescribed course. For example, let us suppose that the prescribed course is shown as zero degree (i. e. North) on the reading of the compass card (scale), and also that the direction of the ship is 15 degrees (i. e. to East from North), and we take the rudder angle to the port direction. Then, the ship turns to the left direction and approaches zero degree. Such rudder is called "returning rudder." In the case of automatic steering gear, the algebraic sum of the above rudder angle and the above checking rudder angle appears as the actual rudder angle.

The "returning rudder angle" is the angle of the returning rudder as above defined.

The "rudder returning means" is the means of the returning rudder as above defined.

While the principles of the invention have been described above in connection with one specific embodiment thereof, it is to be clearly understood that this description is made only by way of example and not as a limitation on the scope of the invention.

What is claimed is:

1. In apparatus for automatically controlling the steering of a craft provided with a rudder returning means responsive to the deviation of the craft from a prescribed course, a rudder checking means to prevent deviation of the craft beyond the prescribed course, means responsive to the angular velocity of deviation of the craft from the prescribed course and means connecting the said two rudder means and angular velocity of deviation means to a steering control device, that improvement comprising, a gyro-compass actuated azimuth motor which rotates in a direction and with a rotational velocity proportional to the angular and time deviation of the craft from the prescribed course, a rotary voltage regulator connected to said azimuth motor by a secondary rotor in said voltage regulator to induce a voltage proportional to the angle of deviation of the craft from the prescribed course, and effectively measure the torque of said azimuth motor, a return-control voltage regulator to induce a voltage proportional to the angle of the rudder returning means, a reversible motor actuated by said rotary control voltage regulator and return-control voltage regulator which is connected to a steering motor, said steering motor being connected to said return-control voltage regulator and said reversible motor to control the rudder angle in response to the voltage of said return-control voltage regulator.

2. In apparatus for automatically controlling the steering of a craft provided with a rudder returning means responsive to the deviation of the craft from a prescribed course, a rudder checking means to prevent deviation of the craft beyond the prescribed course, means responsive to the angular velocity of deviation of the craft from the prescribed course and means connecting the said two rudder means and angular velocity of deviation means to a steering control device, that improvement comprising, a gyro-compass actuated azimuth motor which rotates in a direction and with a rotational velocity proportional to the angular and time deviation of the craft from the prescribed course, a rotary voltage regulator connected to said azimuth motor by a secondary rotor in said voltage regulator to induce a voltage proportional to the angle of deviation of the craft from the prescribed course, and effectively measure the torque of said azimuth motor, a return-control voltage regulator to induce a voltage proportional to the angle of the rudder returning means, a reversible motor actuated by said rotary control-voltage regulator and return-control voltage regulator which is connected to a steering motor, said steering motor driving a telemotor and being connected to said return-control voltage regulator and said reversible motor to control the rudder angle in response to the voltage of said return-control voltage regulator.

3. In apparatus for automatically controlling the steering of a craft provided with a rudder returning means responsive to the deviation of the craft from a prescribed course, a rudder checking means to prevent deviation of the craft beyond the prescribed course, means responsive to the angular velocity of deviation of the craft from the prescribed course and means connecting the said two rudder means and angular velocity of deviation means to a steering control device, that improvement comprising, a gyro-compass actuated azimuth motor which rotates in a direction and with a rotational velocity proportional to the angular and time deviation of the craft from the prescribed course, a rotary voltage regulator connected to said azimuth motor by a secondary rotor in said voltage regulator to induce a voltage proportional to the angle of deviation of the craft from the prescribed course, and effectively measure the torque of said azimuth motor, a return-control voltage regulator to induce a voltage proportional to the angle of the rudder returning means, a reversible motor actuated by said rotary control-voltage regulator and return-control voltage regulator which is connected to a steering motor, said return-control voltage regulator having a primary coil winding which winding may be varied as to the number of windings to thereby vary the ratio of the rudder angle to the angle of deviation from the prescribed course, said steering motor being connected to said return-control voltage regulator and said reversible motor to control the rudder angle in response to the voltage of said return-control voltage regulator.

4. An automatic control mechanism for steering a craft as in claim 1 in which an eddy current brake gear is provided for the shaft of the reversible motor whereby the rotation of the said motor can be made stable, and the effect of the checking rudder can be regulated by varying the exciting current of the said brake gear.

References Cited in the file of this patent

UNITED STATES PATENTS

| | | |
|---|---|---|
| 1,612,434 | Henderson | Dec. 28, 1926 |
| 1,729,869 | Elsasser | Oct. 1, 1929 |
| 1,871,469 | Rhea et al. | Aug. 16, 1932 |
| 1,996,450 | Bes | Apr. 2, 1935 |
| 2,015,183 | Hodgman | Sept. 24, 1935 |
| 2,131,951 | Hodgman | Oct. 4, 1938 |
| 2,551,839 | Jaeschke | May 8, 1951 |